Dec. 28, 1965      W. J. SKINNER ETAL      3,225,425
METHOD OF FABRICATING A METAL ARTICLE
Filed Jan. 10, 1963      5 Sheets-Sheet 1

INVENTORS
WILLIAM J. SKINNER
EARL D. SCOTT
BY  *m. a. Hobbs*
ATTORNEY

Dec. 28, 1965   W. J. SKINNER ETAL   3,225,425
METHOD OF FABRICATING A METAL ARTICLE
Filed Jan. 10, 1963   5 Sheets-Sheet 2

INVENTOR.
WILLIAM J. SKINNER
EARL D. SCOTT
BY
M. A. Hobbs
ATTORNEY

Dec. 28, 1965

W. J. SKINNER ETAL 3,225,425

METHOD OF FABRICATING A METAL ARTICLE

Filed Jan. 10, 1963

INVENTOR.
WILLIAM J. SKINNER
EARL D. SCOTT
BY
*m. a. Hobbs*

ATTORNEY

Dec. 28, 1965     W. J. SKINNER ETAL     3,225,425
METHOD OF FABRICATING A METAL ARTICLE
Filed Jan. 10, 1963     5 Sheets-Sheet 4

INVENTORS
WILLIAM J. SKINNER
EARL D. SCOTT
BY
ATTORNEYS

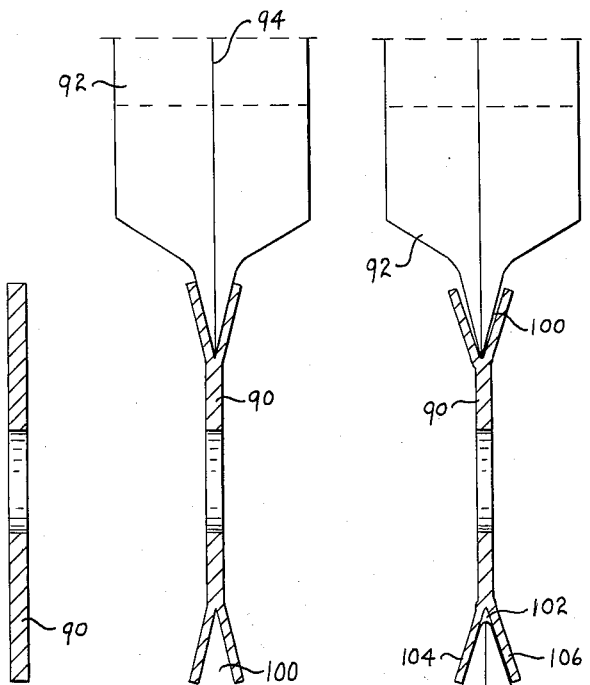
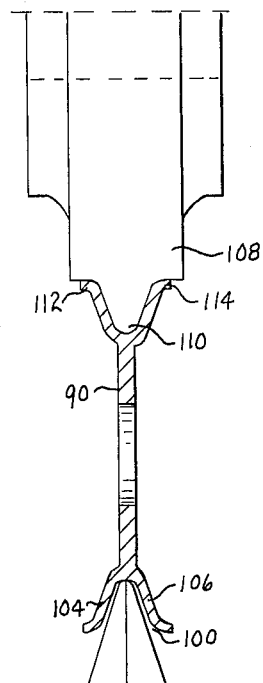
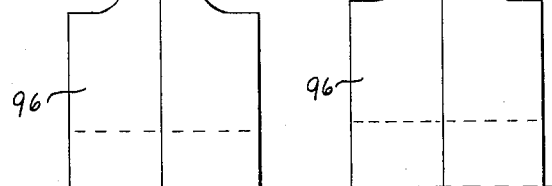
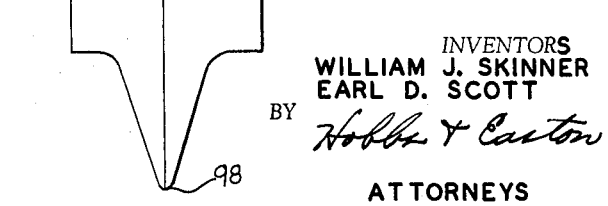

United States Patent Office 3,225,425
Patented Dec. 28, 1965

3,225,425
METHOD OF FABRICATING A METAL ARTICLE
William J. Skinner and Earl D. Scott, Walkerton, Ind., assignors, by mesne assignments, to Small Business Administration, Indianapolis, Ind., an agency of the United States
Filed Jan. 10, 1963, Ser. No. 250,629
9 Claims. (Cl. 29—159)

The present invention relates to metal fabrication and more particularly to a method of fabricating sheaves, pulleys and similar articles, and to the articles made by the method. This application is a continuation-in-part of our copending application Serial No. 97,799, filed on March 23, 1961, now abandoned.

In the fabrication of grooved metal pulleys, sheaves and the like, the usual practices involve casting, stamping and/or machining operations or a combination of two or more of these operations. The cast sheaves are formed as a solid body with an integral hub and a peripheral groove, and are then machined by drilling and turning to remove flashings and spurs and to true the bodies circumferentially to the desired size. This fabrication operation requires several independent steps, usually necessitating separate handling of the partially completed units between each successive step, thus resulting in excess costs in labor and equipment. In some instances the sheaves are machined from solid bar or plate stock, including machining the hub and groove and the external side contour to the required dimensions; however, this method is expensive and is not extensively used in the field, requiring relatively low cost, competitive units for home appliances, such as washing machines, laundering and drying equipment. A method extensively used at the present time involves a stamping operation in which two lateral halves of the sheave are made separately and then spot welded or riveted together to form the groove and possibly the hub; the latter, however, is often formed separately and secured to the center of the two assembled lateral sides by welding, riveting or metal flanging operation. This third type of fabricating operation uses several inexpensive metal forming and joining operations, but the parts formed by each step are normally handled individually between steps and frequently do not have the required accuracy for high speed, heavy duty, and service-free operation. It is therefore one of the principal objects of the present invention to provide a method of fabricating sheaves and other grooved articles of this general type using one or two simple operations, which minimizes separate machining and handling operations and maintains close tolerances.

Another object of the invention is to provide a method for forming sheaves, pulleys and articles of similar structure, in which the flange and body thereof are formed as a single piece initially, starting with a flat disc of metal sheet or plate material, and in which the flanges forming the groove are equal in total thickness to the original thickness of the sheet or plate material.

Still another object of the invention is to provide a sheave, pulley and similar flanged and grooved devices of a one piece metal body and flange construction with the flanges being equal in thickness to one half the body thickness and with the internal faces of the flanges being worked by the forming operation sufficiently to provide a hardened, wear resistant, burnished surface.

A further object is to provide a relatively simple and rapid process for producing V-belt sheaves and the like, which process can be performed on either manually or automatically controlled equipment using only low or moderate pressures or forces and using standard metal sheet or plate material readily available on the market.

Another object of the invention is to provide high strength, non-frangible sheaves for heavy-duty, high speed application which can be produced under conditions and with materials which render them competitive in price with conventional inferior sheaves and which are more reliable and durable and require less service than conventional sheaves.

Additional objects and advantages of the invention will become apparent from the following description and accompanying drawings, wherein:

FIGURE 11 is a vertical cross sectional view through the blank shown in FIGURE 10, the section being taken on line 11—11 of FIGURE 10;

FIGURE 12 is a cross sectional view through a partially formed blank and a fragmentary view of the tool used in the first step of the modified process, the section being taken on line 12—12 of FIGURE 10;

Figure 10:
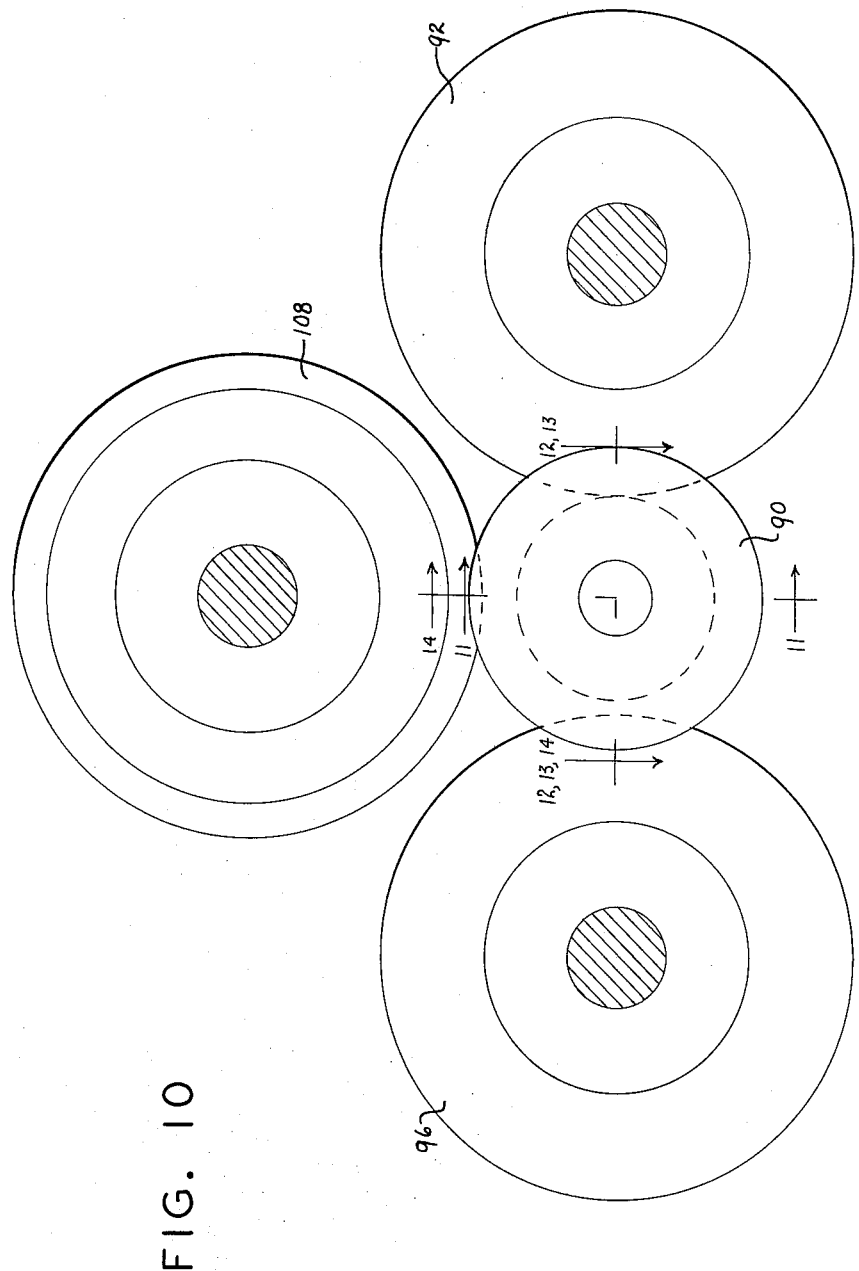
FIGURE 10 is an elevational and partial cross sectional view of the tools utilized in a modified form of the present invention, showing the operation of the tools on a blank for a sheave.

FIGURE 13 is a cross sectional view through the partially formed blank and elevational views of the tools performing the operation, the section being taken on line 13—13 of FIGURE 10; and FIGURE 14 is a cross sectional view of a sheave formed by the present modified process and fragmentary elevational views of the tools used in the final stages of the process, the section of the sheave being taken on line 14—14 of FIGURE 10.

Figure 1:
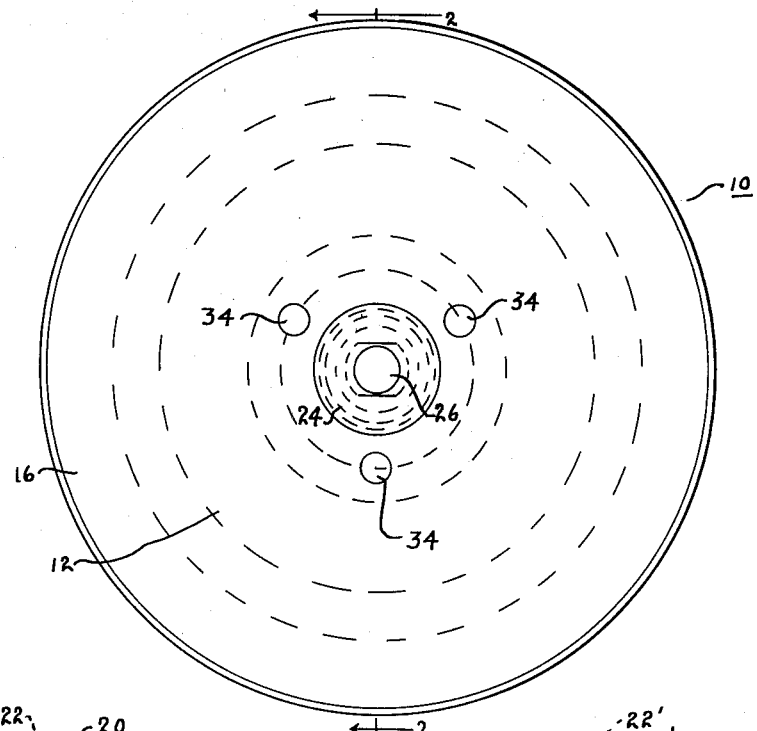
FIGURE 1 is a side elevational view of a sheave embodying our invention.
Figure 2:
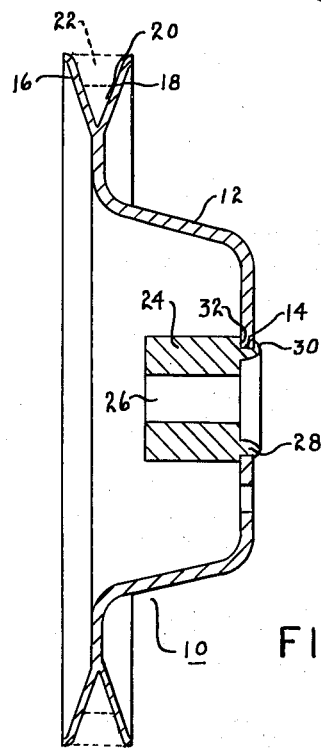
FIGURE 2 is a vertical cross sectional view of the sheave shown in FIGURE 1, taken on line 2—2 of the latter figure.
Figure 3:
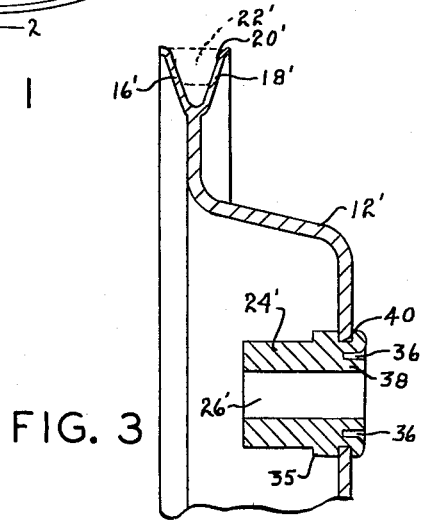
FIGURE 3 is a vertical cross sectional view of a modified form of the sheave shown in the preceding figures, the section being taken on the same line as the section of FIGURE 2.
Figure 8:
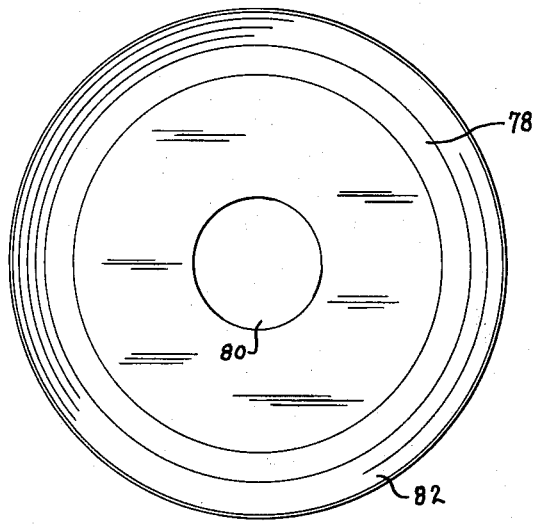
FIGURE 8 is a side elevational view of a modified form of sheave formed by the present method.
Figure 9:
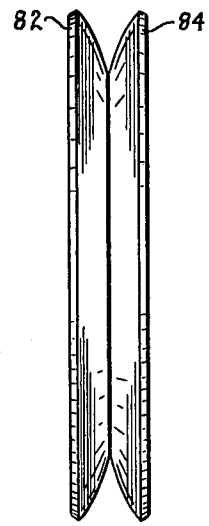
FIGURE 9 is an edge elevational view of the sheave shown in FIGURE 8.

Referring more specifically to the drawings, the sheave 10 shown in FIGURES 1 and 2 consists of a cup-shaped body portion 12 having a center hole 14 and integral flanges 16 and 18 forming an annular peripheral groove 20 for receiving a V-belt 22, shown in broken lines, cable, rope or the like. A hub 24 having a bore 26 for receiving a shaft (not shown) of a motor for driving the sheave or a power input shaft of some type of machine, mechanism or device (not shown), is secured to the center of body 12 by extending a reduced diameter portion 28 through the hole and swaging the annular end portion 30 of the hub firmly against the margin of the body defining the hole. The swaging operation clamps the adjacent body portion against an annular shoulder 32 and forms a groove which retains the body and hub permanently and rigidly together. While the body portion 12 of the embodiment of the invention illustrated in FIGURES 1, 2 and 3 is cup-shaped, the other features just described are equally applicable to a strictly disc-shaped body portion as shown in FIGURES 8 and 9 or body portions of other desired shapes. In order to retain the blank from which the sheave is fabricated rigidly in the fabricating machine during the forming operation, a plurality of holes 34 equally spaced from the center and from each other are preferably provided in the blank.

The difference between the sheaves shown in FIGURES 2 and 3 is primarily in the hub 24' and in the shape of the flanges 16 and 18 of FIGURE 2 and the flanges 16' and 18' of FIGURE 3, and the respective grooves 20 and 20' formed thereby. In the former the flanges are substantially straight and are joined together at their inner edges to form an acute angle, whereas the flanges of the latter are curved laterally inwardly at their inner edges to form a smooth rounded bottom in groove 20'. The hub structure in FIGURE 3 is different from the hub structure of FIGURE 2 particularly with respect to the portion forming the means securing the hub to body 12'. The latter hub is provided with an annular rib 35 against which the inner side of body 12' seats and an annular groove 36 separates the flange 38 forming groove 40 from the center of the hub to facilitate an effective joint during the swaging operation.

The method of forming the present one-piece body and flange construction shown in FIGURES 1, 2 and 3 is illustrated in FIGURES 4 through 7 and consists basically in parting the marginal edge of a disc-shaped blank or other shaped blanks having an annular flange extending radially outwardly and concentrically disposed with the axis of the blanks. The complete method includes first forming the blank 48 from which the sheave is made by stamping or otherwise forming a disc or cup-shaped blank from metal sheet or plate material, and preferably drilling or stamping holes 34 therein. The blank which is preferably not heated is placed in a lathe, for example, and clamped firmly therein between head and tail members 50 and 52 concentric with the axis of rotation of the two members, and thence rotated at a predetermined speed. Members 50 and 52 are steel bodies having flat radial and matching surfaces 54 and 54' for clamping the blank therebetween, and preferably having a plurality of projections for seating in holes 34, the radial surfaces terminating in annular angular surfaces 56 and 56' which form the die surfaces corresponding to the desired final angle of flanges 16 and 18 of the sheave. As the blank is rotated, parting tool 60, consisting of a roller 62 having an annular cutting or parting edge 64 and tapered sides 66 and 68 corresponding to angular surfaces 56 and 56', is fed at a predetermined rate into the peripheral edge of blank 48, causing the lateral sides of the blank to separate and, as tool 60 reaches the end of its travel, to form flanges 16 and 18 with the two flanges pressed firmly against surfaces 56 and 56'. At the end of travel, tool 60 is rotated or spun momentarily against the internal surfaces of the two flanges to superficially work the metal forming the flanges and burnish and polish the surfaces forming groove 20 to provide a hardened wear-resistant surface on the flanges. The foregoing operation is strictly a parting operation in which the metal forming the margin of the blank is separated and pressed laterally against members 56 and 56' without reducing the total thickness of the two flanges to less than the original thickness of the blank margin.

Figures 4, 5:
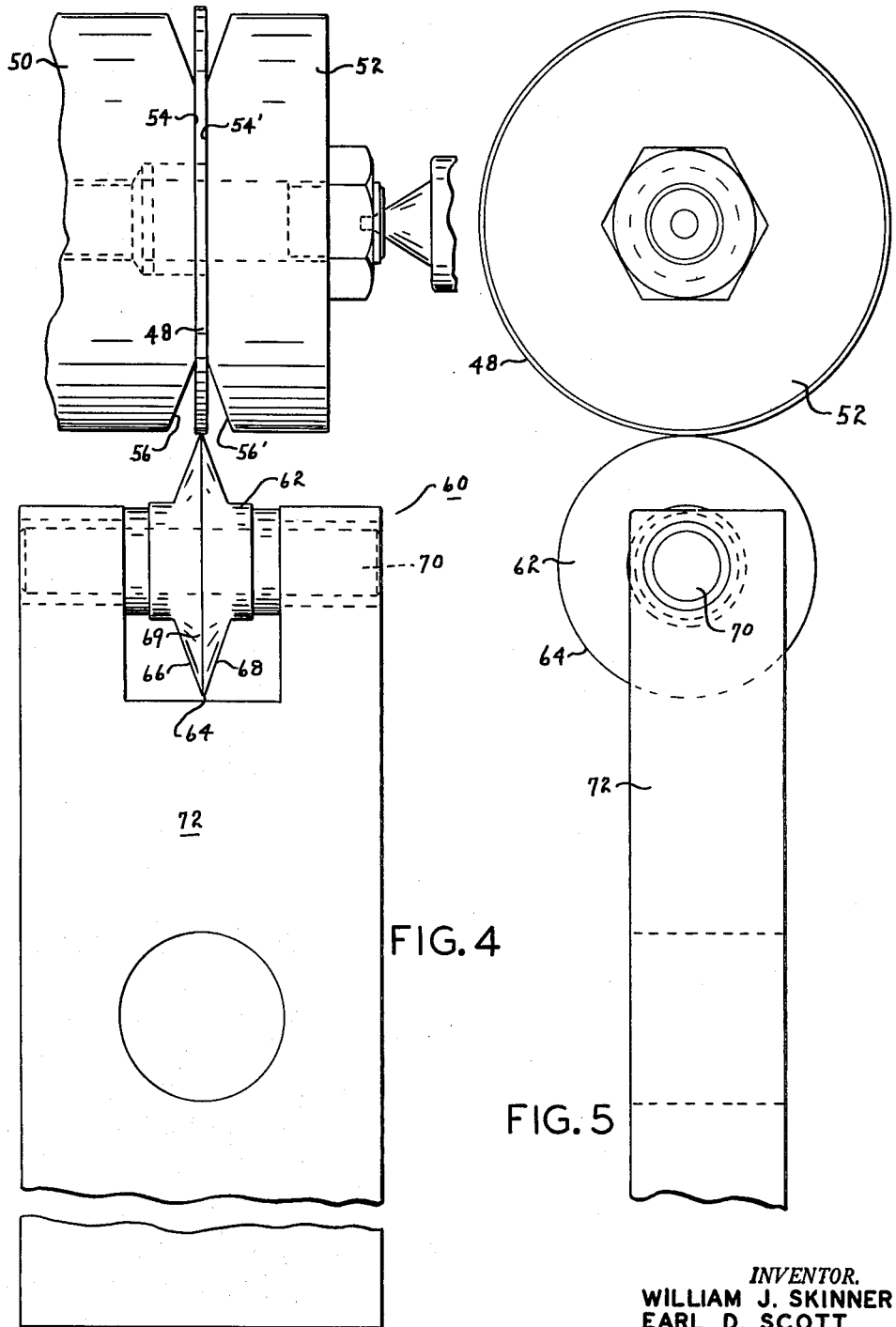
FIGURE 4 is a top plan view of the principal mechanism employed in producing the sheave of the preceding figures, illustrating in part the manner in which the present method is performed.
FIGURE 5 is a side elevational view of the mechanism shown in FIGURE 4, illustrating the same step of the method as that represented in FIGURE 4.
Figure 6:
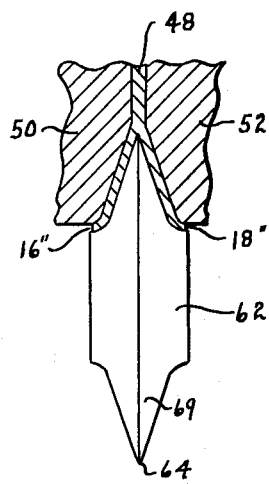
FIGURE 6 is a top plan view of one type of tool used in performing the present method, the figure including a fragmentary view of the sheave being formed thereby to illustrate one step of the operation.

As seen in FIGURES 4 through 6, roller 62 is provided with a parting rib 69 of triangular cross sectional shape with substantially straight lateral sides so that a minimum amount of working or distortion occurs in the metal in the flanges during the operation. The roller is mounted on a pin 70 and rotates freely thereon in response to the applied rotative force of the blank, the pin being rigidly supported by base 72 which is the support for the roller, and is fed inwardly toward the blank and withdrawn by any suitable conventional or standard tool feeding mechanism, manually or automatically controlled. The tool at the base of rib 69 and the marginal edges of surfaces 56 and 56' may be correspondingly rounded to form a bead or laterally turned edge 16" and 18" on the periphery of flanges 16 and 18 in the manner illustrated in FIGURE 6. Various modifications in the tool can be made and the roller can be revolved rapidly around the blank while the latter is held stationary or rotated slowly in the opposite direction.

Figure 7:
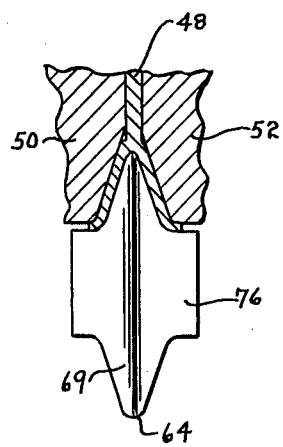
FIGURE 7 is a top plan view of a modified form of tool used in performing the method and of a portion of the sheave being formed thereby to illustrate the operation.

FIGURE 7 illustrates a modified form of the present invention in which the parting edge 64 of rib 69 of tool 76 is rounded to form the type of groove 20 of FIGURE 3. A greater amount of metal working and deformation is likely to occur in the operation when tool 76 is used, and some thinning of the flanges at the external margins and thickening at their internal margins will normally occur. Tool 76 may be used after the sheave has been initially formed by tool 62 if desired.

In one example, a disc-shaped blank of substantially the same size and shape as the sheave 78 shown in FIGURE 8 is stamped from twelve gauge steel sheet material and perforated to form hole 80, and is then clamped between head and tail members 50 and 52 and rotated at a peripheral speed of between 500 and 800 feet per minute. Roller 62 is advanced and edge 64 forced inwardly in to the edge of the blank as the roller is rotated by contact at the rate of .010 inch per revolution of the blank with the edge of the blank. As the roller is advanced the disc shaped blank is parted edge-wise, forming two flanges 82 and 84 of equal thickness and of a total thickness equal to the original thickness of the blank. The particular curvature of the side walls of the flanges is determined by the configuration of side walls 66 and 68 of the roller and of the radial surfaces 56 and 56' of head and tail members 50 and 52; however, these surfaces should be substantially straight.

A modified form of the present invention illustrated in FIGURES 10 through 14 consists of progressive slitting and forming operations performed in overlapping relationship to one another without withdrawing the tools performing the various operations until the V-groove has been fully formed in the edge of the blank. This overlapping step relationship, coupled with the application of pressure on diametrically opposite sides of the blank simultaneously, is particularly important in reducing the pressures or forces required to form the sheave and in increasing the rate at which the process can be fully performed.

Referring to FIGURE 10, a disc-shaped blank 90, preferably with its periphery trued to give a straight axial surface for receiving the first cutting tool, is placed between the head and tail members 50 and 52 and rotated in the manner previously described with reference to the first embodiment set forth herein, and tool 92 of the shape shown in FIGURE 12 and containing a sharp peripheral or slitting edge 94 is urged inwardly against the periphery of blank 90, commencing the slitting or parting operation. Promptly thereafter, tool 96 of a shape similar to tool 92 is pressed inwardly into the slot 100 created by tool 92, tool 96, however, being provided with a blunt, curved peripheral edge 98. The degree at which tool 92 precedes tool 96 is illustrated in FIGURE 13 at numeral 102. Tool 96 is positioned diametrically opposite tool 92 and, during the slitting and groove expanding operation, minimizes or greatly reduces the lateral thrust and pressure on blank 90 and the rotating spindle of the machine. This diametrically opposite relationship of tools 92 and 96 not only reduces the wear on the machine spindle bearings and shafts, but also results in a more accurately formed sheave at an increased rate of production.

After tool 96 has entered slot 100 urging flanges 104 and 106 outwardly away from the tapered center portion of tool 92, tool 108 with a broad, blunt peripheral portion 110, enters slot 100 and urges the flanges 104 and 106 further apart, as illustrated in FIGURE 14. It is seen that the three tools progressively slit, expand and form the blank, first forming slot 100 and then urging the flanges 104 and 106 formed thereby outwardly away first from tool 92 and then from tool 96, until the configuration shown in FIGURE 14 is obtained. All three tools move completely to their inner terminus before any one of the three is withdrawn from slot 100. Tool 108 may be so formed as to produce laterally extending portions or beads 112 and 114 at the peripheral edge of flanges 104 and 106, respectively. After the slot 100 has been fully formed, i.e. after the V-groove has been formed, tools 92, 96 and 108 are withdrawn simultaneously from the groove and returned to their initial starting position preparatory to the next sheave forming operation. An important feature of the present invention as illustrated in the embodiment of FIGURES 10 through 14 is the progressive, simultaneous and overlapping relationship of the slitting, expanding and forming operations performed by tools 92, 96 and 108, and the diametrical and simultaneous application of pressure to the sheave blank. In the embodiment just described, tools 92, 96 and 108 are freely rotatable on shafts or other suitable bearing members; however, in some applications of the present process, it may be desirable to drive any one or all three tools at preselected speeds with reference to the speed of the blank.

In performing the present method, it may be desirable to feed the parting roller into the blank at a relatively high rate of speed in order to cause the parted metal flanges to remain substantially straight throughout the operation rather than roll or curve laterally to any appreciable degree. The method is a cold metal operation and can be performed on standard commercial steel, aluminum and other metals, the blanks thereof preferably being stamped or otherwise severed from sheet or plate material.

The method is particularly adapted to the manufacture of V-belt sheaves and can be performed with one or a plurality of form rollers. With a series of tools, a slitting roller of the type previously described is used to form flanges 16 and 18 followed by a bottom form roller and a double split roller adjustable for proper groove width by spacers. Rollers for forming radial grooves or other markings of a suitable pattern can be applied to inner surfaces of the flanges for the purpose of providing a no-slip surface for belts operating under oily, wet or other adverse conditions and providing better traction with less belt tension.

While two embodiments of the present method and article have been described in detail herein, changes and further modifications may be made without departing from the scope of the invention.

We claim:

1. In a method of forming V-belt sheaves: the steps comprising forming a metal disc-shaped blank, rotating said blank at a peripheral speed of between 500 and 800 feet per minute, initially slitting said blank at its peripheral edge in the center thereof to form a peripheral groove and two angularly extending flanges, progressively pressing said flanges laterally at a point on said blank substantially diametrically opposite the point at which said blank is slit, expanding said groove while progressively slitting the blank and retaining said flanges substantially straight from the point of juncture with one another at the bottom of said groove to the periphery of the flanges, progressively spreading said flanges apart while slitting and expanding said groove to produce a rounded bottom in said groove with the inner side walls of said flanges tangent thereto, and forming laterally extending flanges on the peripheral edges of said first mentioned flanges.

2. In a method of forming V-belt sheaves: the steps comprising forming a metal disc-shaped blank, rotating said blank, initially slitting said blank at its peripheral edge to form a peripheral groove and two angularly extending flanges, progressively pressing said flanges laterally at a point on said blank substantially diametrically opposite the point at which said blank is slit, and expanding said groove while progressively slitting the blank and retaining said flanges substantially straight from the point of juncture with one another at the bottom of said groove to the periphery of the flanges, and progressively spreading said flanges apart to produce a rounded bottom in said groove with the inner side walls of said flanges tangent thereto.

3. In a method of forming V-belt sheaves: the steps comprising forming a metal disc-shaped blank, rotating said blank at a peripheral speed of between 500 and 800 feet per minute, initially slitting said blank at its peripheral edge to form a peripheral groove and two angularly extending flanges, and progressively pressing said flanges laterally at a point on said blank substantially diametrically opposite the point at which said blank is slit, and expanding said groove while progressively slitting the blank and retaining said flanges substantially straight from the point of juncture with one another at the bottom of said groove to the periphery of the flanges, the flanges being of equal thickness and having a total thickness equal to the original thickness of the blank.

4. In a method of forming sheaves, pulleys and similar grooved articles: the steps comprising forming a metal disc-shaped blank, rotating said blank, initially slitting said blank at its peripheral edge to form a peripheral groove and two angularly extending flanges, and progressively pressing said flanges laterally at a point on said blank substantially diametrically opposite the point at which said blank is slit, and expanding said groove while progressively slitting the blank and retaining said flanges substantially straight from the point of juncture with one another at the bottom of said groove to the periphery of the flanges.

5. In a method of forming sheaves, pulleys and similar grooved articles: the steps comprising forming a metal disc-shaped blank, rotating said blank, initially slitting said blank at its peripheral edge to form a peripheral groove and two angularly extending flanges, progressively pressing said flanges laterally at a point on said blank substantially diametrically opposite the point at which said blank is slit, and expanding said groove while progressively slitting the blank, and progressively spreading said flanges apart while expanding said groove to produce a rounded bottom in said groove with the inner side walls of said flanges tangent thereto.

6. In a method of forming sheaves, pulleys and similar grooved articles: the steps comprising forming a metal disc-shaped blank, rotating said blank, initially slitting said blank at its peripheral edge to form a peripheral groove and two angularly extending flanges, progressively pressing said flanges laterally at a point on said blank substantially diametrically opposite the point at which said blank is slit, and expanding said groove while progressively slitting the blank, and progressively spreading said flanges apart while slitting and expanding said groove.

7. In a method of forming sheaves, pulleys and similar grooved articles: the steps comprising forming a metal disc-shaped blank, rotating said blank, initially slitting said blank at its peripheral edge to form a peripheral groove and two angularly extending flanges, progressively pressing said flanges laterally and expanding said groove while progressively slitting the blank, and progressively spreading said flanges apart while slitting and expanding said groove.

8. In a method of forming sheaves, pulleys and similar grooved articles: the steps comprising forming a metal disc-shaped blank, rotating said blank, initially slitting said blank at its peripheral edge to form a peripheral groove and two angularly extending flanges, progressively pressing said flanges laterally at a point on said blank substantially diametrically opposite the point at which said blank is slit, and expanding said groove while progressively slitting the blank.

9. In a method of forming sheaves, pulleys and similar grooved articles: the steps comprising forming a metal disc-shaped blank, rotating said blank, initially slitting said blank at its peripheral edge to form a peripheral groove and two angularly extending flanges, progressively pressing said flanges laterally, and expanding said groove while progressively slitting the blank.

References Cited by the Examiner

UNITED STATES PATENTS

| | | |
|---|---|---|
| 521,787 | 6/1894 | Fisher. |
| 1,494,410 | 5/1924 | Bidle _____ 29—159 |
| 1,555,771 | 9/1925 | Stenz _____ 29—159 |
| 3,080,644 | 3/1963 | Previte et al. _____ 29—159 |
| 3,087,531 | 4/1963 | Pacak _____ 29—159 XR |

JOHN F. CAMPBELL, *Primary Examiner.*

WHITMORE A. WILTZ, *Examiner.*